Patented Feb. 5, 1935

1,990,202

UNITED STATES PATENT OFFICE 1,990,202

OLEFINE-POLYSULPHIDE PLASTIC

Joseph C. Patrick, Kansas City, Mo.

No Drawing. Application June 3, 1929,
Serial No. 368,193

17 Claims. (Cl. 260—17)

The present invention relates to improvements in plastic substances, and more particularly in the general type of moldable plastic materials of the olefine-polysulphide type, such as are described in my prior application Serial No. 239,808, filed December 13, 1927.

As disclosed in my prior application, above referred to, the olefine-polysulphide plastics of my invention may be roughly classified into two types; a soft product and a hard product, depending primarily upon the proportion of sulphur in the polysulphide compound employed in producing the plastic, and to some extent, upon the method of production. In general, the best hard plastic, which resembles vulcanite, bakelite and similar materials in its physical properties, is derived by the use of a polysulphide ranging from a minimum atomic proportion of $S_{1.5}$ to $S_{2.2}$ to a maximum of $S_{3.5}$ to $S_{3.75}$. In the upper ranges, the product resembles in some of its properties the soft type of plastic, more particularly described in my prior application above referred to. The present invention has to do more particularly with the hard type of plastic, which is normally hard and is capable of being molded under moderate heat.

In carrying out the present invention, a stabilized polysulphide solution is first prepared. The soluble polysulphides of the alkali or alkaline earth metals may be employed, but in general, the use of the sodium polysulphide is preferred for economic reasons. In preparing the polysulphide, the selected alkali, for example, caustic soda, in aqueous solution or dispersion, is caused to react with sulphur and the solution boiled for a considerable period of time to produce a stabilized compound. For example, a suitable polysulphide solution may be prepared in the following manner:

3 kilograms of caustic soda are dissolved in about 6 liters of water. The required proportion of sulphur to secure the desired proportion of sulphur in the polysulphide, which may be from 2 to 4 kilograms, is weighed into a container and, if desired, may be moistened with a liquid such as alcohol, acetone, an alcohol-benzol mixture, or the like, which will aid in wetting the sulphur. The greater portion of the alkali solution is added to the sulphur, say about 90%, is added to the sulphur and the mixture boiled until the sulphur has substantially completely entered into combination and the "wetting" liquid distilled off. The remainder of the alkali solution may then be added together with sufficient water to bring the total volume of the solution to about 10 liters. The solution at this point is not stabilized, probably containing both higher and lower polysulphide complexes than correspond to the proportion of sulphur present. The solution is accordingly heated under a reflux condenser or under pressure in an autoclave for a considerable period of time, say up to 20 hours under atmospheric pressure and for less periods under higher pressure. By this treatment, a stabilized material is secured, and the solution is rapidly filtered, preferably while taking precautions to prevent oxidation. Thus, by proceeding in the above described manner, employing caustic soda and sulphur in the proportions by weight of 3 to 2, a solution of polysulphide corresponding to the formula $Na_2S_{1.5}$ is secured. If the caustic soda and sulphur are in substantially equal proportions by weight, the resulting polysulphide has a formula corresponding to the polysulphide $Na_2S_{2.75}$. By employing caustic soda and sulphur in the relative proportions of 48 to 59 a polysulphide corresponding to $Na_2S_{3.61}$ is formed, and by using caustic soda and sulphur in the proportions of 40 to 61, a polysulphide corresponding to the formula $Na_2S_{4.72}$, containing some free sulphur, is produced. It is readily apparent that the same procedure may be employed in producing other soluble polysulphides, such as those of potassium, ammonium, calcium, barium, and the like, for use in the subsequent stages of the process. It is apparent that a polysulphide solution which has not been stabilized may be employed, but is not equally desirable.

A typical plastic of the hard type may be prepared in the following manner:

A polysulphide solution, for example, a sodium polysulphide solution, wherein the polysulphide has the empirical formula $Na_2S_{2.85}$, is diluted with water to reduce its gravity to approximately that of ethylene dichloride. A quantity of ethylene dichloride is then added, preferably somewhat less than the equivalent quantity required for reaction. It is obvious that either an equivalent quantity or an excess of ethylene dichloride may be employed, but it is preferred, for economic reasons, that there be a slight excess of the polysulphide present. Thus, in the present example, 720 grams of ethylene dichloride are employed for each 1,000 grams of polysulphide present in solution. The polysulphide solution and ethylene dichloride are then boiled together under a reflux condenser until a test of the spent liquid shows the absence of dissolved sulphides, this point being shown practically by a disappearance of the characteristic polysulphide color. Approximately two hours at the boiling point of the mixture (about 170° F. or a little lower) is sufficient. A highly plastic, yellow mass accumulates in the container, and is separated from the liquid. It is kneaded with hot water to remove soluble salts and dried. In a short while, say 24 to 36 hours, it becomes hard, resembling vulcanite, synthetic resin products and celluloid in external appearance. It may be molded while soft, or after it has become hardened, it may be molded on reheating, beginning to soften at about 200° F. It can be heated to a temperature of about 350° F., at which it may be cast, without decomposition. It is readily apparent that the product, while soft, may be mixed with any desired pigments, fillers or the like. When cast or molded, it fits or reproduces the finest impressions in the mold, and the hard product may be turned or otherwise readily worked with suitable tools.

The following example illustrates another method of producing the hard plastic product of the present invention, certain features of the procedure being set forth and claimed in my co-pending application Serial No. 369,912, filed June 10, 1929.

A solution of sodium polysulphide of the empirical formula $Na_2S_{2.2}$ is prepared, containing about 177 grams polysulphide sulphur per 1,000 cc. To each 1,000 cc. of such solution, about 40 grams of calcium oxide, freshly slaked with 200 cubic centimeters of water is added. The mixture is thoroughly agitated, about 300 cubic centimeters of a water miscible alcohol (ethyl, methyl, isopropyl or the like) is added and 180 cubic centimeters of ethylene dichloride is then added slowly at a rate to prevent the temperature of the mixture rising above about 145° F. The apparatus in which the mixing is conducted is provided with a reflux condenser to prevent loss. The plastic product separates out as a greenish-blue, coarsely granular product. This powder is thoroughly washed with water to remove excess polysulphide and soluble salts, and is finally washed with a dilute acid solution of sulphuric or hydrochloric acid (say, about ½ N.) to decompose and remove any residual calcium salts. In this washing, the product becomes white, is separated from the washing liquid by filtration, again washed with water, and dried to constant weight. It is not softened or decomposed at the temperature of boiling water and does not dissolve, nor does it swell on contact with carbon disulphide. When heated to about 270° F., it acquires the consistency of a stiff dough, and can be molded readily. Temperatures of 270 to 325° F. may be employed in molding it.

The hard type of plastics herein described is secured with polysulphides containing such proportions of sulphur that the plastic product contains from about 63 to about 75% of sulphur, the said sulphur being in a combined form. As stated hereinbefore, the upper limit of sulphur in the hard type of plastic may vary somewhat in accordance with the method of separation. Thus, products produced by the method set forth in the second example above may contain slightly more sulphur, say 1 to 2%, than products obtained in accordance with the first method, while retaining the characteristics of the hard product.

Pigments, and more particularly the mineral pigments, such as iron oxide pigments, Prussian blue, chrome green, aluminum powder, lead oxide and the like may be incorporated with the powder to secure any desired coloration thereof. Similarly, lakes and rubber dyes may be used to color the product. Any desired fillers may be incorporated therein, such as carbon black, wood flour, asbestos fiber, whiting, magnesium carbonate and the like.

Large quantities of sulphur may be incorporated with the plastic product, even in proportions as high as 10 parts of sulphur to 1 of the plastic. The sulphur and the plastic material appear to be mutually soluble at molding temperature, and the product is a tough, strong, rubber-like plastic in which the sulphur apparently shows no tendency to crystallize. On heating these mixtures of sulphur and plastic for temperatures around 260 to 270° F. more or less, for some time, say 3 to 4 days, rubber-like bodies of a greenish-yellow color are obtained, which are permanently stable. The formation of such bodies is apparently aided by the presence of sulphur carriers, such as the various metallic oxides, in proportions as low as 2 to 4% by weight.

Although the invention has been described in connection with the use of ethylene dichloride, it will be understood, of course, that other olefine dihalides may be employed, such as ethylene dibromide, propylene dichloride or dibromide, and the like. The expression "olefine-polysulphide reaction body" (or product or plastic) in the claims is intended to mean the material that is obtainable by causing an olefine dihalide such as these, to react with such polysulphides as those mentioned above.

I claim:

1. A normally hard, thermo-plastic olefine-polysulphide reaction body containing from about 63 to about 70% of combined sulphur.

2. A normally hard, thermo-plastic ethylene-polysulphide reaction body containing from about 63 to 70% of combined sulphur.

3. A granular, powdered olefine-polysulphide reaction product containing from 63 to 70% of combined sulphur, said powder being thermo-plastic at temperatures above the boiling point of water.

4. The method of producing a normally hard, thermo-plastic substance which comprises reacting upon an olefine dihalide with a soluble polysulphide in which the proportion of sulphur is from 1.5 to 3.5 times that of the corresponding monosulphide.

5. The method of producing a normally hard, thermo-plastic olefine-polysulphide product which comprises reacting upon an olefine dihalide with a sodium polysulphide within the range $Na_2S_{1.5}$ to $Na_2S_{3.75}$ in the presence of water.

6. The method of producing a normally hard, thermo-plastic olefine-polysulphide product which comprises reacting upon an olefine dihalide with a sodium polysulphide within the range $Na_2S_{1.5}$ to $Na_2S_{3.75}$ in the presence of water and alcohol.

7. The method of producing a normally hard, thermo-plastic olefine-polysulphide product which comprises reacting upon an ethylene dihalide with a sodium polysulphide within the range $Na_2S_{1.5}$ to $Na_2S_{3.75}$ in the presence of water and alcohol.

8. The method of producing a normally hard, thermo-plastic olefine-polysulphide product which comprises reacting upon an ethylene dihalide with a sodium polysulphide within the range $Na_2S_{1.5}$ to $Na_2S_{3.75}$ in the presence of water and freshly slaked calcium hydroxide.

9. The method of producing a normally hard, thermo-plastic olefine-polysulphide product which comprises reacting upon an olefine dihalide with a sodium polysulphide within the range $Na_2S_{1.5}$ to $Na_2S_{3.75}$ in the presence of water and freshly slaked calcium hydroxide.

10. The method of producing a normally hard, thermo-plastic olefine-polysulphide product which comprises reacting upon an olefine dihalide with a sodium polysulphide within the range $Na_2S_{1.5}$ to $Na_2S_{3.75}$ in the presence of water, alcohol and freshly slaked calcium hydroxide.

11. A composition of matter comprising a sufficient amount of a normally hard, thermo-plastic olefine-polysulphide reaction body containing from about 63 to about 70% of combined sulphur to cause the composition to be hard.

12. The method of producing a normally hard, thermo-plastic substance which comprises reacting upon an olefine dihalide with a soluble polysulphide in which the proportion of sulphur is from 1.5 to 3.5 times that of the corresponding mono-sulphide.

13. The method of producing a normally hard, thermo-plastic compound which comprises reacting with a soluble polysulphide in which the proportion of sulphur is from 1.5 to 3.75 times that of the corresponding mono-sulphide upon a reactive olefine body having a $C_nH_{2n}$ group bonded to a halogen element replaceable by said polysulphide.

14. The method of producing a normally hard, thermo-plastic substance which comprises reacting upon an olefine dichloride with a soluble polysulphide in which the proportion of sulphur is from 1.5 to 3.5 times that of the corresponding mono-sulphide.

15. The method of producing a normally hard, thermo-plastic substance which comprises reacting upon an ethylene dichloride with a soluble polysulphide in which the proportion of sulphur is from 1.5 to 3.5 times that of the corresponding mono-sulphide.

16. A composition of matter comprising a pigment and a sufficient amount of normally hard, thermo-plastic olefine-polysulphide reaction body containing from about 63 to about 70% of combined sulphur to cause the composition to be hard.

17. A composition of matter comprising a dry filler and a sufficient amount of a normally hard, thermo-plastic olefine-polysulphide reaction body containing from about 63 to about 70% of combined sulphur to cause the composition to be hard.

JOSEPH C. PATRICK.